(No Model.)
U. FAUSSEREAU.
BICYCLES AND TRICYCLES.
No. 509,122.  Patented Nov. 21, 1893.
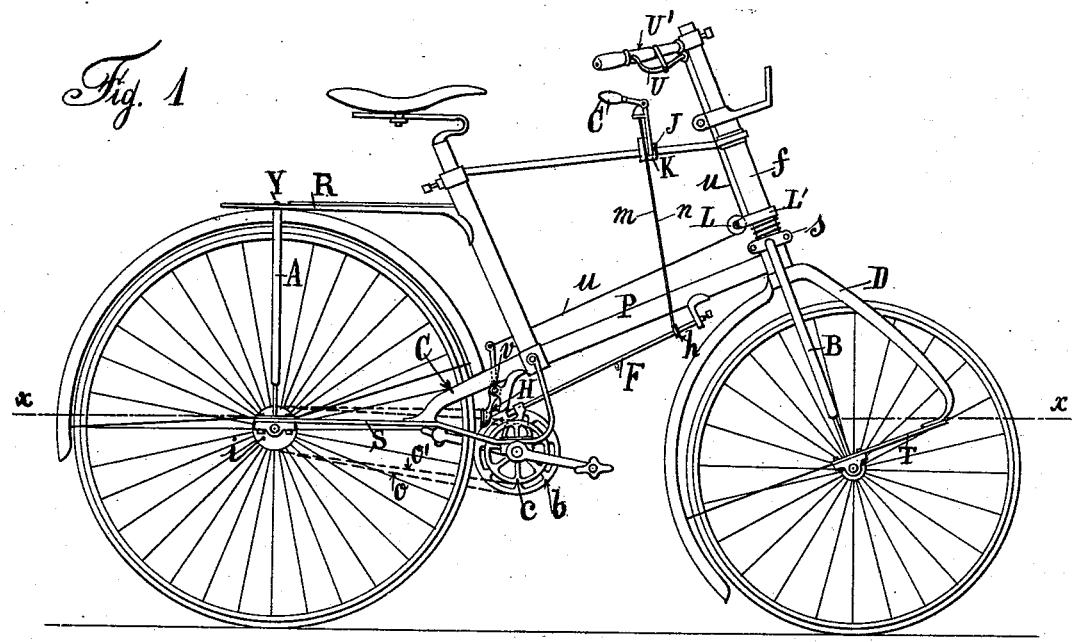
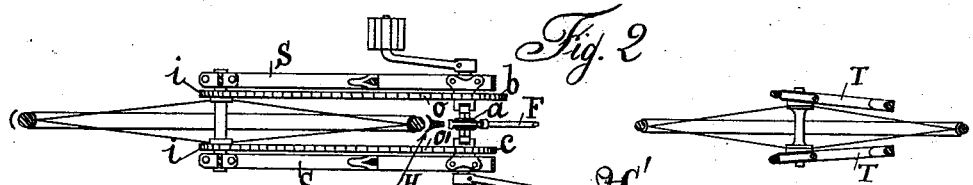
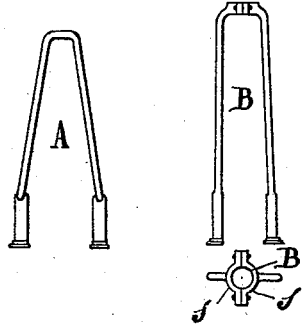
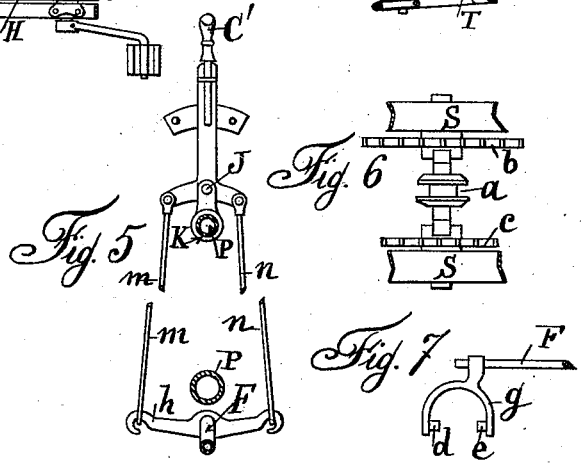
Witnesses.  Inventor.
Urbain Faussereau,
By H. A. de Vos,
Attorney.

UNITED STATES PATENT OFFICE.

URBAIN FAUSSEREAU, OF LA BERNERIE, FRANCE.

BICYCLE OR TRICYCLE.

SPECIFICATION forming part of Letters Patent No. 509,122, dated November 21, 1893.

Application filed November 9, 1892. Serial No. 451,417. (No model.) Patented in France April 7, 1892, No. 220,643.

*To all whom it may concern:*

Be it known that I, URBAIN FAUSSEREAU, a citizen of the French Republic, residing at La Bernerie, France, have invented certain new and useful Improvements in Bicycles or Tricycles, (for which I have obtained Letters Patent in France, No. 220,643, dated April 7, 1892,) of which the following is a specification.

My improvement consists in primarily providing a system of support for the frame of the bicycle or similar vehicle which will do away with the necessity of pneumatic tires, and to that end consists in the construction, combination, and arrangement, of the various parts shown and described in the following specification of which the accompanying drawings form a part, wherein similar letters of reference designate like or equivalent parts throughout the several views and in which—

Figure 1 represents a side elevation of my improved vehicle; Fig. 2 a plan view on the line $x$—$x$ of Fig. 1 of the lower part of same; Fig. 3 a front view of the rear fork; Fig. 4 an elevation and plan view of the front fork; Fig. 5 a front view of the coupling lever on an enlarged scale; Fig. 6 a plan view of the coupling mechanism on an enlarged scale; Fig. 7 an elevation of the apparatus on an enlarged scale by which the coupling of one or the other wheel is accomplished.

As will be seen in Fig. 1, the fork A connects the suspension springs S with the elastic rod R, which forms part of the body of the bicycle and is located in one plane with the same. This elastic rod R is jointed to the fork A at Y. The fork A has for its object, to effect the co-operation of the two elastic rods R and S and to hold the driving wheel in one plane with the body of the velocipede. This fork is made of one piece, and is rigid in its upper part and flattened and flexible in its lower parts. The front fork B is fastened with its upper part to the steering socket $f$ by means of two half collars $s$ and with its lower parts to the elastic rods T, which rest on the axle of the steering wheel. The two half collars $s$ slide on the steering socket $f$. As stated before, the lower ends of the forks A and B are flattened to make the same flexible and able to carry a heavier load; if they were hinged to the rods S and T they would also fulfill the same purpose, which is to keep the wheels in the plane of the machine, but they could not carry as heavy a load.

C represents a fork connected at one end to the rods S of the driving wheel and at the other end to the lower part of the body of the machine.

D represents a fork on which the pivot of the steering wheel is arranged and of which the lower parts are fastened to the elastic rods T.

The elastic rods S, which are arranged one on each side of the driving wheel, carry at one of their ends the axle of this wheel and from the point of attachment of the fork C, the rods S are bent down to the height required for the axle of the treadles. The other ends are fastened to the frame and formed in such a manner that they can carry the bearings, the axle of the treadles, the tooth wheels and the clutch.

The form of the rod S may be changed according to taste and to the weight to be carried. For instance, instead of being connected with the frame, this end may be bent under the prongs of the fork C, and while becoming thinner be laid over the other part of the rod in order to strengthen the same. Or, adhering to the form as illustrated, a second elastic rod may be arranged to run from the prong of the fork C toward the axle of the wheel, all according to the weight to be carried, without deviating from the principle of suspension.

T represents elastic rods arranged one on each side of the steering wheel and connecting the fork D with the axle. These rods may also be double ones. To increase the strength, a bent or spiral spring may be arranged above the collar of the fork B, as shown.

The uncoupling and coupling (see Figs. 5, 6 and 7), are effected by means of the lever C', which is moved to the right or to the left in accordance with the desired velocity. This lever is pivoted at J to the link K, which is mounted on the upper part of frame P, and works on the lever $h$ by means of tie-bars $m$, $n$, a side view of which is given in Fig. 1, and a rear view in Fig. 5.

In the middle of the lever $h$ and rigidly connected therewith is arranged an axle F, which carries at its rear end the segment $g$ provided with lugs or projections $d$, $e$, as shown in Fig.

7. The projections *d, e* are placed in the grooves of the clutch *a*, (see Fig. 6,) which slides on the axle of the treadles, and is adapted to couple with the large cog-wheel *b*, if the lever C' is thrown to the right or with the small cog-wheel *c*, if the lever is thrown to the left. As the two small cog-wheels *i*, which are arranged one on each side of the driving wheel, have the same diameter, it will be easily understood that a different velocity is imparted to the two cog-wheels *b* and *c* of different diameter, by medium of the chains *o* and *o'*. When the lever C', by which the coupling is effected, is held in a vertical position, the mechanism will be entirely thrown out of gear, *i. e.* the square holes in the clutch *a* will be disengaged and the treadles inactive. The rider may thus use the treadles as a place to rest his feet on when going down hill or when the velocipede has obtained a certain velocity. The mounting L' serves also as a stop for the collars *s*, in heavy shocks. The wire *u* moves the brake H, which is pivoted at *v*, and which acts on the driving wheel, thereby obtaining a better and more prompt result, than can be obtained by brakes acting on the steering wheel.

I do not desire to limit myself to the exact form and mounting of the different parts of my apparatus, but

What I claim is—

1. In a bicycle or similar vehicle, the combination with the driving wheel, of a fork C, a saddle standard, an elastic rod R connected with the saddle standard, a fork A connected at the top with the elastic rod R and at the bottom with the axle-boxes of the wheel by elastic metallic connections, flat springs S, connected at one end with the driving wheel axle-boxes, at the middle with the ends of the forks C and at the front end with the saddle standard or frame, as shown, a fork D for the front wheel, straight springs T connected at one end with the bottom of the fork D and at the other with the forward axle-boxes, a steering spindle connected at the bottom end with the top of the fork D and at the top with the steering handle U', a steering socket *f* in which such spindle is revolubly mounted, a frame piece P connecting the steering socket with the fork C and the saddle standard, and a fork B having elastic lower portions connected with the axle-boxes of the forward wheel at the bottom and provided with a collar *s* at the top adapted to slide up and down on the steering socket *f*, substantially as shown and described.

2. In a bicycle or similar vehicle, the combination with the driving wheel, of a fork C, a saddle standard, an elastic rod R connected with the saddle standard, a fork A connected at the top with the elastic rod R and at the bottom with the axle-boxes of the wheel by elastic metallic connection, flat springs S, connected at one end with the driving wheel axle-boxes, at the middle with the ends of the fork C and at the front end with the saddle standard or frame, the forward end of the same being bent downward and then upward, as shown, a crank axle supported by the springs S at the depending portions thereof, gearing connecting such axle with the driving wheel, a fork D for the front wheel, straight springs T connected at one end with the bottom of the fork D and at the other with the forward axle-boxes, a steering spindle connected at the bottom end with the top of the fork D and at the top with the steering handle U', a steering socket *f* in which such spindle is revolubly mounted, a frame piece P connecting the steering socket with the fork C and the saddle standard, and a fork B having elastic lever portions connected with the axle-boxes of the forward wheel at the bottom and provided with a collar *s* at the top adapted to slide up and down on the steering socket *f*, substantially as shown and described.

3. In a bicycle or similar vehicle, the combination with the driving wheel, of a fork C, a saddle standard, an elastic rod R connected with the saddle standard, a fork A connected at the top with the elastic rod R and at the bottom with the axle-boxes of the wheel by elastic metallic connection, flat springs S, connected at one end with the driving wheel axle-boxes, at the middle with the ends of the forks C and at the front end with the saddle standard or frame, as shown, a fork D for the front wheel, straight springs T connected at one end with the bottom of the fork D and at the other with the forward axle-boxes, a steering spindle connected at the bottom end with the top of the fork D and at the top with the steering handle U', a steering socket *f* in which such spindle is revolubly mounted, a frame piece P connecting the steering socket with the fork C and the saddle standard, a fork B having elastic lower portions connected with the axle-boxes of the forward wheel at the bottom and provided with a collar *s* at the top adapted to slide up and down on the steering-socket *f*, and a collar L' rigidly mounted upon the steering-socket *f* and a spring interposed between the same and the sliding collar *s*, substantially as shown and described.

In testimony that I claim the foregoing I have hereunto set my hand this 16th day of September, 1892.

URBAIN FAUSSEREAU.

Witnesses:
   VICTOR MATRAY,
   F. MATRAY.